Nov. 21, 1933.     W. M. REYNOLDS     1,935,889
CULTIVATOR
Filed June 6, 1931     4 Sheets-Sheet 1

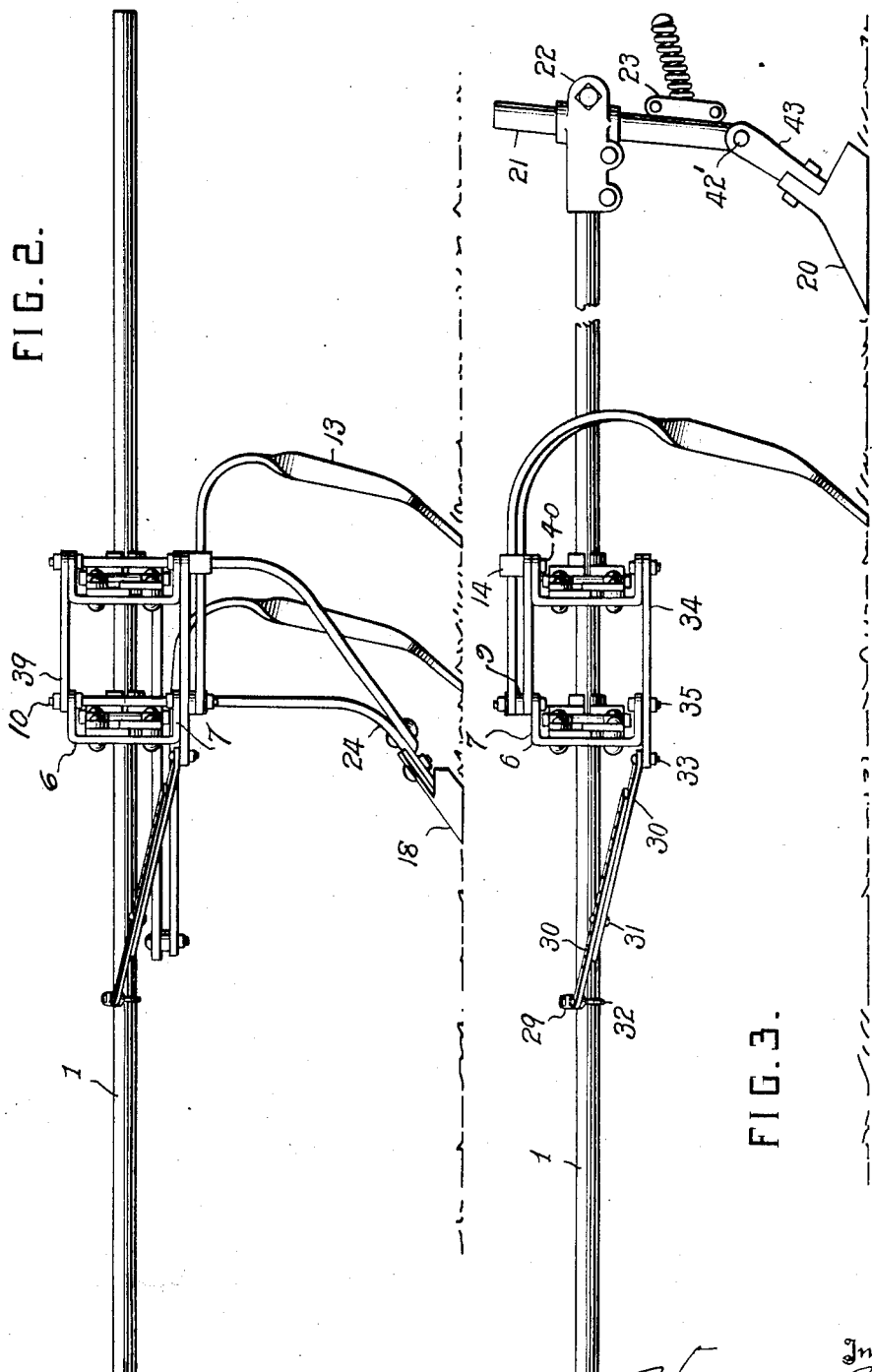

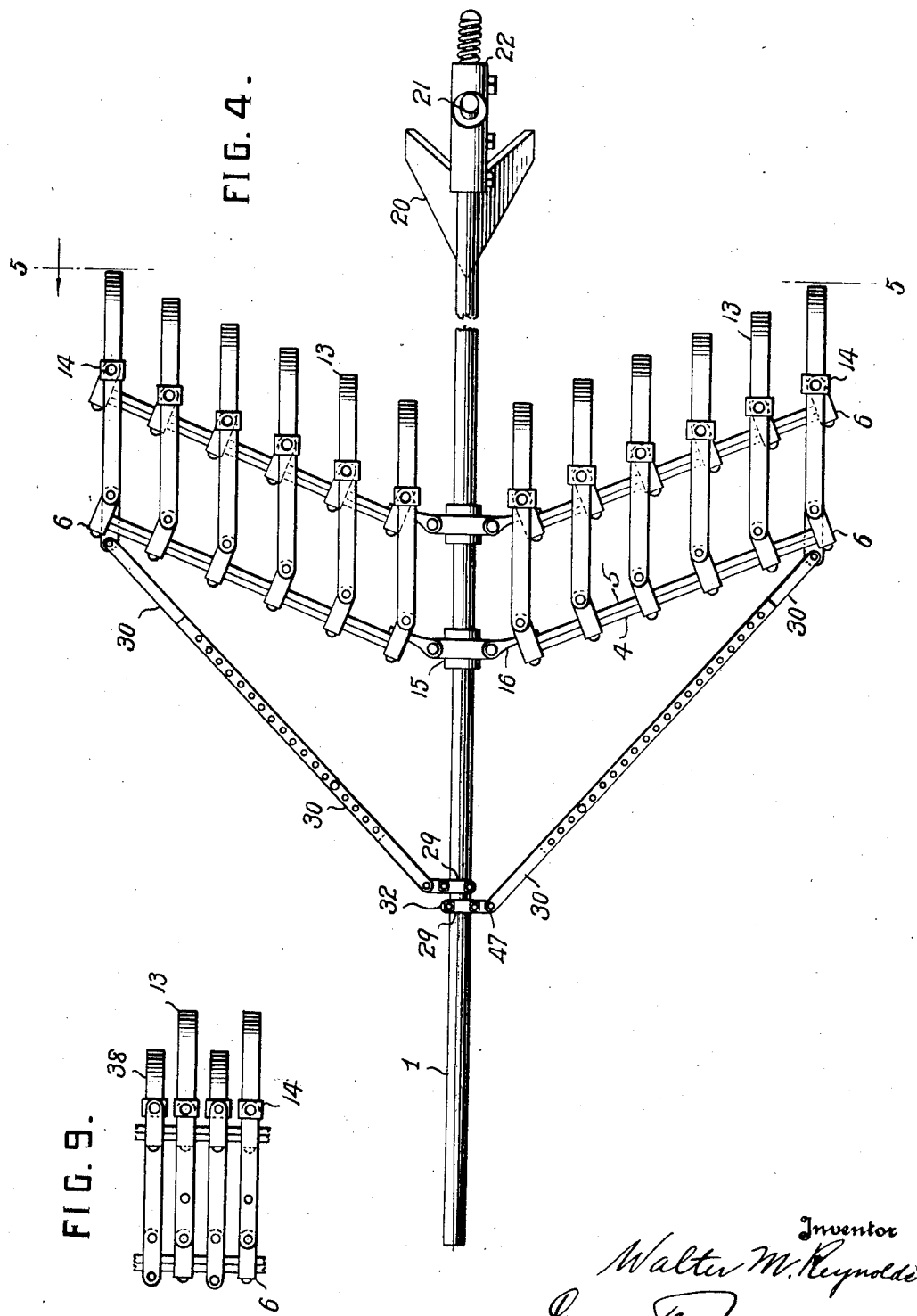

Nov. 21, 1933.  W. M. REYNOLDS  1,935,889
CULTIVATOR
Filed June 6, 1931  4 Sheets-Sheet 4

Patented Nov. 21, 1933

1,935,889

UNITED STATES PATENT OFFICE 1,935,889

CULTIVATOR

Walter M. Reynolds, Corpus Christi, Tex., assignor of one-third to John Wilde, Willacy County, Tex.

Application June 6, 1931. Serial No. 542,599

5 Claims. (Cl. 97—176)

The present invention relates to an improved cultivator attachment and is especially adapted for use in connection with tractor cultivators and any other style of cultivator from the one horse to tractor type inclusive.

An important object of the present invention is to improve the construction of a cultivator, the teeth of which can be adjusted angularly backwardly and forwardly, and can also be adjusted angularly in a vertical direction, improved means being provided for retaining the cultivator teeth in adjusted position.

Another object of the invention is to provide a hinged connection and drag bar clamping means for parallelogram tooth carrying wings which may be quickly and easily attached to any style cultivator drag bar and which will maintain the teeth in vertical and parallel position irrespective of the angular adjustment horizontally and vertically of the wings.

A further object of the invention is to provide a cultivator attachment in which either a pair of cultivator teeth carrying wings or a single wing can be secured to any type of drag bar which the user may have on hand so that the attachment may be used as a straddle row cultivator, or may be used to cultivate between the plant rows.

Another object of the invention is to provide feet or implement carriers above and below the cultivator wings, so that tooth shanks can be secured either on the top or the bottom of the wings or so that cultivator shovel shanks can be secured to the bottom of the wings if desired.

Another object of the invention is to provide improved and compact means for retaining the implement carrying wings in horizontal and vertically adjusted position, such means having no projecting parts which would be likely to cause injury to the plants being cultivated, which is especially desirable in cotton cultivation.

With these and other objects in view, the invention consists in the improved and rigid construction and novel combination of parts hereinafter fully described, illustrated in the accompanying drawings, and defined in the claims; it being understood that various changes in the form, proportion and minor details of construction, and the substitution of equivalent elements, within the scope of the claims, may be resorted to without departing from the spirit of the invention.

Referring to the drawings,

Figure 2 is a side elevation of the attachment showing the application of spring teeth and cultivator feet to the implement;

Figure 3 is a side elevation of the attachment with the shovels removed and having the spring teeth secured to the top of the implement and a plow foot applied to the drag bar;

Figure 4 is a plan view of the construction shown in Figure 3;

Figure 9 is a fragmentary plan view showing the application of spring teeth to the attachment in staggered relation to each other.

Figure 1:
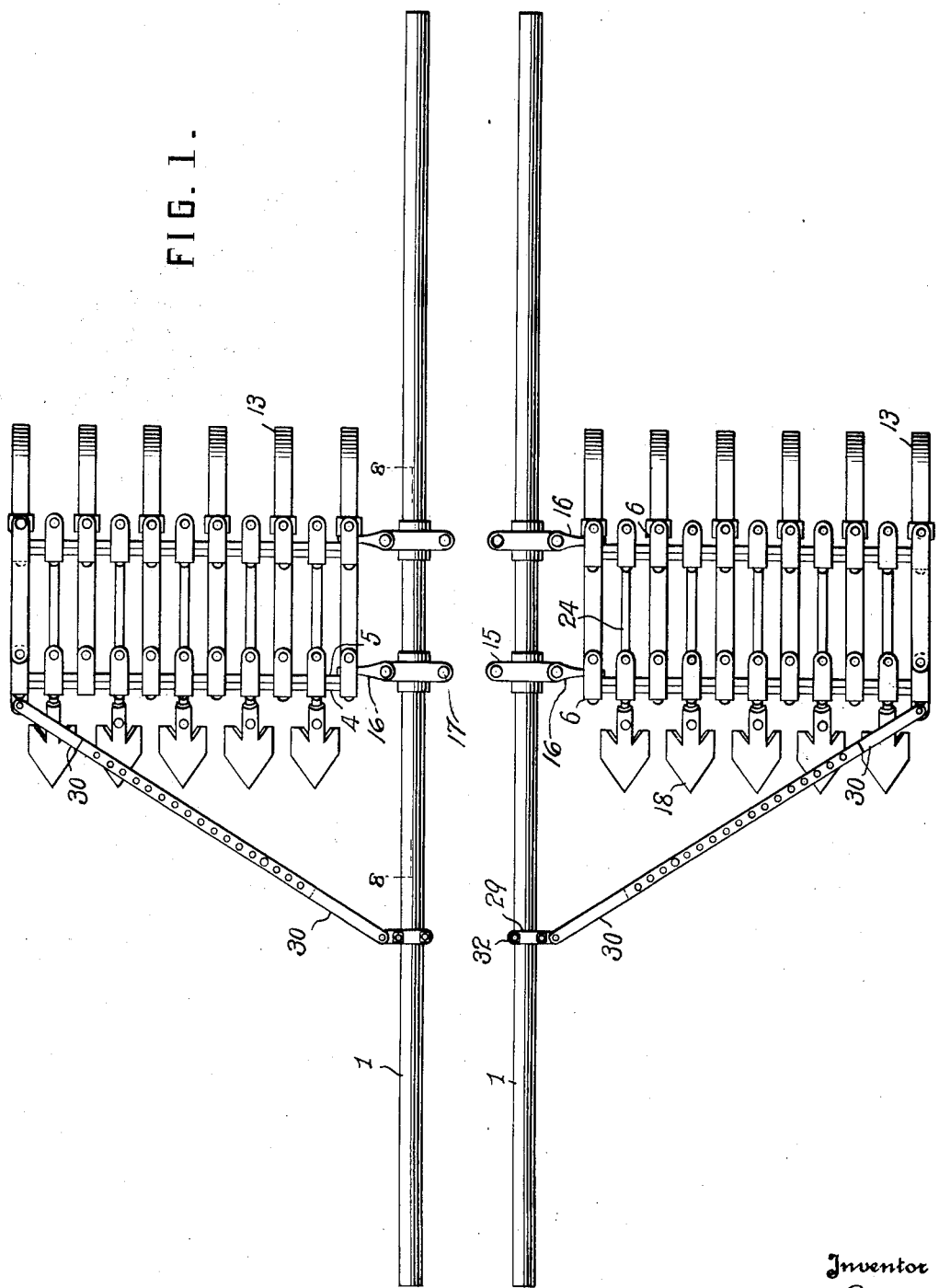
Figure 1 is a plan view of a pair of single winged cultivator units showing the wings in expanded position.
Figure 6:
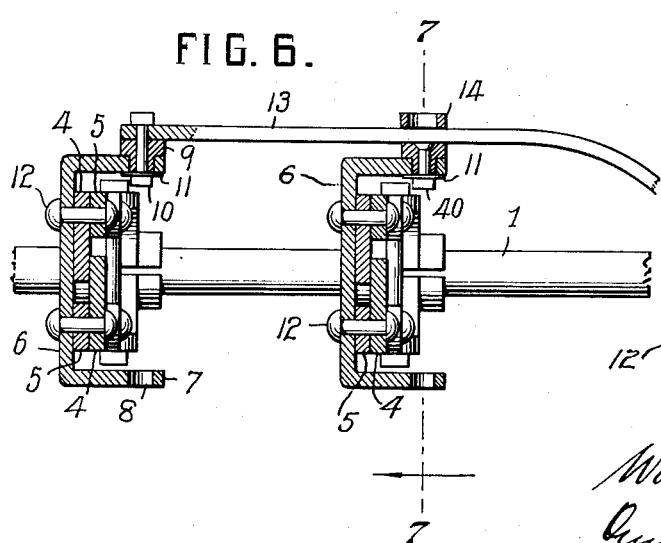
Figures 6 and 7 are fragmentary sectional views of the attachment showing certain novel details of construction.

Referring to the drawings, the numeral 1 designates a drag bar or the beam of a cultivator to which the wings are to be secured, the beam being carried by a tractor cultivator or other form of cultivator. Pivotably secured to the drag bar 1 are the laterally extending arms 4 and 5 having pivotably secured thereto the carriers or feet 6 to which the earth working implements 13 are pivotably secured either at the laterally extending top or bottom extensions formed on the carriers, as more clearly shown in Figure 6. The extensions 7 are provided with apertures 8 to pivotally receive stepped collars 9 and 14, which are secured to the feet 6 at the front of the cultivator wings with securing elements 10 and at the rear thereof with securing elements 40, washers 11 being provided to retain the stepped collars in pivotally secured relation to the carriers 6. The spring tooth 13 is pivotally secured to the front series of carriers 6 and slidably retained by the rear series, braces 39 being provided to retain the constant spaced relation between the front and rear laterally extending arms 4, 5. The carriers 6 are adapted to have secured thereto several types of implements, such as the spring teeth 13, resilient shanks 41, carrying reversible implements 19 or plow foot standards 24 carrying the cultivator shovels 18, as more clearly shown in Figures 1 and 2. It will, of course, be understood that any type of earth working implement having a shank designed to be secured in the apertured portion 8 of the carrier or by means of suitable adapters or stepped collars 9, can be secured to the laterally extending wings. A plow sweep such as 20, shown in Figures 3 and 4, may be employed in connection with the other earth working implements referred to. In the present instance, the sweep 20 is secured to the cultivator beam or drag bar 1, the sweep being provided with a shank 21 pivotally secured at 42' to the blade carrying bracket 43. The standard or shank 21 is secured to the drag bar by means of the clamp 22 and either a suitable break pin or resilient releasable connection 23 is provided to normally retain the sweep 20 in normal working position.

The laterally extending arms 4 and 5 have a universal connection with the drag bars. The connecting means comprises the links 16 pivotally secured to the laterally extending arms 4 and 5, by means of the rivets 42 and bolt and nut securing means 17, which serves the additional purpose of securing the split sleeve members 15 on the drag bar 1. The links 16 are readily secured to the clamps 15 and the latter are easily secured to the drag bar without removing any parts which may already be secured to the bar. Another important feature is the fact that the connecting links 16 and bolts 17 on either side of the drag bar can be removed without disturbing the corresponding links and securing bolt on the opposite side of the drag bar. This permits the clamps secured to a pair of the links 16 to be swung vertically to clamp down upon the drag bar after the removal of one cultivator wing when changing from a double winged cultivator to a single wing cultivator.

Figure 5:
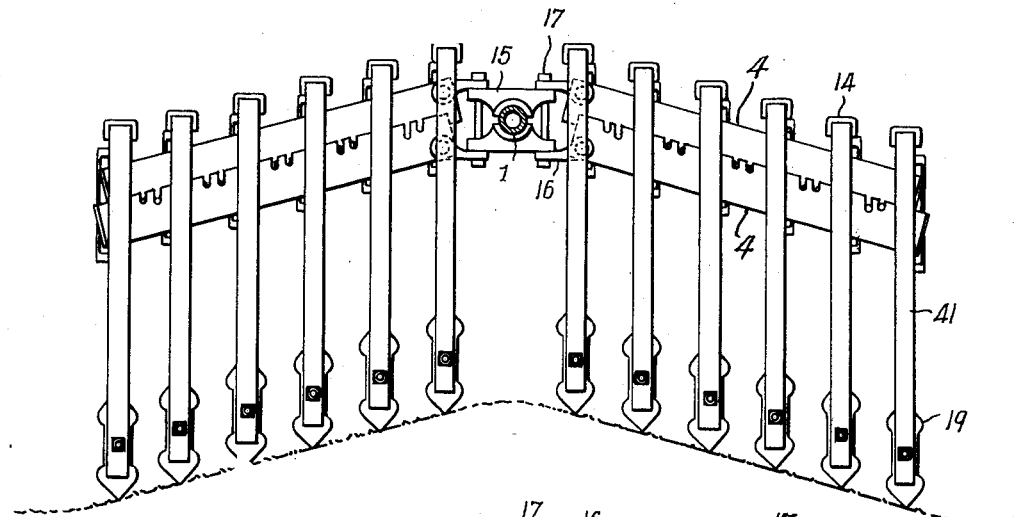
Figure 5 is a rear elevation of the cultivator attachment.
Figure 7:
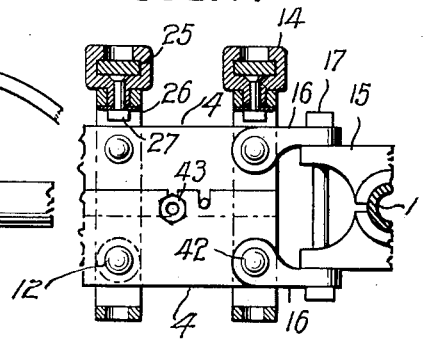

The wings, on opposite sides of the drag bar, through the universal connections of the arms 4 and 5, with the drag bars, are adjustable independently of each other, and have the same type of adjusting means. The front and rear pairs of laterally extending arms 4 and 5 are pivotally secured to, as at 12, and retained in vertical spaced relation by the carriers or feet 6. The members 4 at the front and rear of each wing are arranged in overlapping relation, the lower member 5 acting as a spacer for one of the members 4. Each of the arms 4 is provided with a plurality of slotted holes or notches which are arranged in suitable staggered relation with respect to those on the other arm 4, so that at different degrees of vertical adjustment of the wings at least one of the slots or notches in each of the overlapping members 4 will be in registration to permit the introduction of a securing element, such as the bolt and nut securing means 43, shown in Figure 7. Preferably the staggered notches are disposed throughout the entire length of the overlapping arms 4, as shown in Figure 5. The relative spacing of the notches and holes on each pair of arms at the front and rear of each wing to receive the clamping means 43, it will be understood, is such that various desired increments of vertical adjustment can be obtained, certain of the notches being in registration with each other at different angular positions of vertical adjustment. For example, the outermost notches register with each other when the wing is in a horizontal position; the next inwardly disposed notches register with each other when the outer end of the wing is depressed approximately two inches lower, and so on until the innermost notches are in registration with each other when the wing will be depressed or inclined to its maximum extent.

Figure 8:
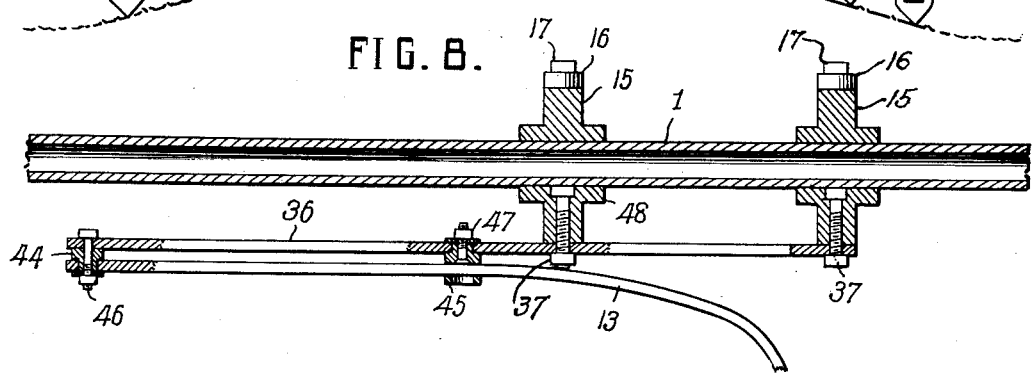
Figure 8 is a sectional view showing the application of a center spring tooth to the drag bar.

Figure 8 shows a modification of the invention in which the lower members 48 of the split clamping means for the wings are provided with portions for securely retaining a central spring cultivator tooth. In the present instance, the cultivator tooth 13 is secured to the bar 36, and the latter is secured to the split clamping means 15, 48 by means of the securing elements 37. The bar 36 is apertured to receive the stepped collars 44 and 45, having securing elements 46 and 47 for securing the spring tooth shank 13 to the collars and the bar 36. When the cultivator is used over a row of plants, the center tooth is removed, and replaced by a guard or shield to protect the plants.

The wings are adapted to be independently adjusted horizontally to vary the width of the implement to suit the character of the soil, the width of the furrows, or heights of beds and other conditions of the land under cultivation, and the teeth are retained in their adjusted position by means of overlapping perforated links 30 pivotally secured to the outer front corners of the cultivator wings by the securing elements 33, and to the drag bar by means of the securing element 47, and the clamping means comprising the strap 29 and U-bolt 32. The backward or forward pivoted adjustment of the cultivator wings is effected either by shifting the clamp members 29 and 32 along the drag bar 1 or by shifting the overlapping links 30 toward or from each other, and the links are secured in adjusted position by means of the securing element 31 passing through registering apertures in the links. The connection of the links 30 to the outer forward corners of the cultivator wings permits the links to serve as deflectors for the limbs and stalks of the plants, so as to prevent injury thereto.

One of the cultivator units may be used as a single row cultivator by securing either one or a pair of cultivator attachments or wings to the drag bar or a plurality of single or double winged units can be secured to a draft bar for the purpose of simultaneously cultivating a plurality of plant rows, the latter arrangement of the units being employed when a tractor is used as the motive power.

It is to be understood that the cultivator attachments may be either horse or tractor drawn for cultivating a plurality of rows and that the clamping means for the wings can be provided with suitable adapters or bushing to fit rectangular, round or other shaped cultivator beams.

Having thus described the invention, what I claim as new and desire to secure by Letters Patent is:

1. A cultivator attachment comprising sleeves secured to a cultivator drag bar, parallelogram wings comprising overlapping arms pivotally secured to the sleeves for horizontal and vertical pivotal adjustment, feet having rearwardly extending horizontal portions above and below the wings and pivotally secured to said overlapping arms, cultivator teeth selectively secured to the upper or lower portions of the feet, and adjustable overlapping links connecting the outer ends of the wings with the drag bar for effecting the horizontal pivotal adjustment, the means for vertical pivotal adjustment of the wings comprising bolts selectively receivable in registering notches in the overlapping arms.

2. A cultivator attachment comprising split sleeves clamped to a cultivator drag bar, parallelogram wings comprising overlapping arms pivotally secured to the sleeves for horizontal and vertical pivotal adjustment, feet having rearwardly extending horizontal apertured portions above and below the wings and pivotally secured to said overlapping arms, means for selectively securing cultivator teeth to the upper or lower portions of said feet, said means comprising stepped collars pivotally secured in the apertured portions of the feet, overlapping links connecting the outer ends of the wings with the drag bar, and bolts selectively receivable in registering apertures in the links for effecting the horizontal pivotal adjustment of the wings, the means for vertical pivotal adjustment of the wings comprising bolts selectively receivable in registering notches in the overlapping arms.

3. A cultivator attachment comprising sleeves secured to a cultivator drag bar, parallelogram wings comprising overlapping apertured arms, universal joint connections between the arms and the sleeves, adjustable links connecting the drag bar with the wings for effecting the horizontal pivotal adjustment of the latter, means for vertical pivotal adjustment of the wings comprising bolts selectively receivable in registering notches in the overlapping arms to secure the latter in adjusted position, and earth working implements secured to said wings.

4. A cultivator attachment comprising sleeves secured to a cultivator drag bar, parallelogram wings comprising overlapping arms pivotally secured to the sleeves for horizontal and vertical pivotal adjustment, feet having rearwardly extending horizontal portions above and below the wings pivotally secured to said overlapping arms, cultivator teeth secured to corresponding rearwardly extending portions of said feet, braces secured to the other portions of the feet, adjustable links connecting the outer forward ends of the wings with the drag bar for effecting the horizontal pivotal adjustment, and means for effecting the vertical pivotal adjustment of the wings comprising bolts selectively receivable in registering notches in the overlapping arms.

5. A cultivator attachment comprising sleeves secured to a cultivator drag bar, wings comprising overlapping arms pivotally secured to the sleeves for horizontal and vertical pivotal adjustment, feet pivotally secured to said overlapping arms, cultivator teeth secured to said feet, means for effecting the horizontal pivotal adjustment of said wings, and means for vertical pivotal adjustment of the wings comprising securing elements selectively receivable in registering notches in the overlapping arms.

WALTER M. REYNOLDS.